(12) United States Patent
Chen et al.

(10) Patent No.: US 8,231,492 B2
(45) Date of Patent: Jul. 31, 2012

(54) TORQUE TRANSMITTING DEVICE

(75) Inventors: Li Chen, Shanghai (CN); Chengliang Yin, Shanghai (CN); Jie Shu, Shanghai (CN); Jian Yao, Shanghai (CN); Chunhao J. Lee, Troy, MI (US); Chi-Kuan Kao, Troy, MI (US); Farzad Samie, Franklin, MI (US); Yu Dong, Shanghai (CN)

(73) Assignees: GM Global Technology Operations LLC, Detroit, MI (US); Shanghai Jiao Tong University, Shanghai (CN)

( * ) Notice: Subject to any disclaimer, the term of this patent is extended or adjusted under 35 U.S.C. 154(b) by 654 days.

(21) Appl. No.: 12/424,896

(22) Filed: Apr. 16, 2009

(65) Prior Publication Data
US 2010/0263978 A1 Oct. 21, 2010

(51) Int. Cl.
*F16H 3/44* (2006.01)
*F16H 48/06* (2006.01)
*F16D 13/42* (2006.01)

(52) U.S. Cl. ............ 475/154; 475/317; 192/70.23; 192/20; 192/84.6; 192/93 A

(58) Field of Classification Search ............ 475/154, 475/317; 192/70.23, 20, 84.6, 93 A
See application file for complete search history.

(56) References Cited

U.S. PATENT DOCUMENTS

| | | | |
|---|---|---|---|
| 6,578,693 B2 * | 6/2003 | Mayr | 192/84.6 |
| 6,684,993 B2 | 2/2004 | Stevenson | |
| 6,742,642 B1 | 6/2004 | Stevenson et al. | |
| 6,988,604 B2 * | 1/2006 | Kelley, Jr. | 192/84.6 |
| 2005/0279601 A1 * | 12/2005 | Tuday | 192/84.6 |
| 2007/0199793 A1 * | 8/2007 | Aschauer | 192/84.6 |
| 2010/0219034 A1 * | 9/2010 | Wheals et al. | 192/93 A |

* cited by examiner

*Primary Examiner* — Justin Holmes
*Assistant Examiner* — Jacob S Scott
(74) *Attorney, Agent, or Firm* — Quinn Law Group, PLLC

(57) ABSTRACT

A torque transmitting device includes a plurality of clutch plates, a ramp member that is selectively rotatable about an axis and that defines a ramp surface, a worm gear that is operatively connected to the ramp member for rotation therewith about the axis, and a roller element contacting the ramp surface. The ramp surface is configured such that, when the ramp member is rotated about the axis, the roller element exerts a reaction force on the ramp surface that urges the ramp member to move in a first axial direction and thereby transmit the reaction force to the clutch plates.

8 Claims, 3 Drawing Sheets

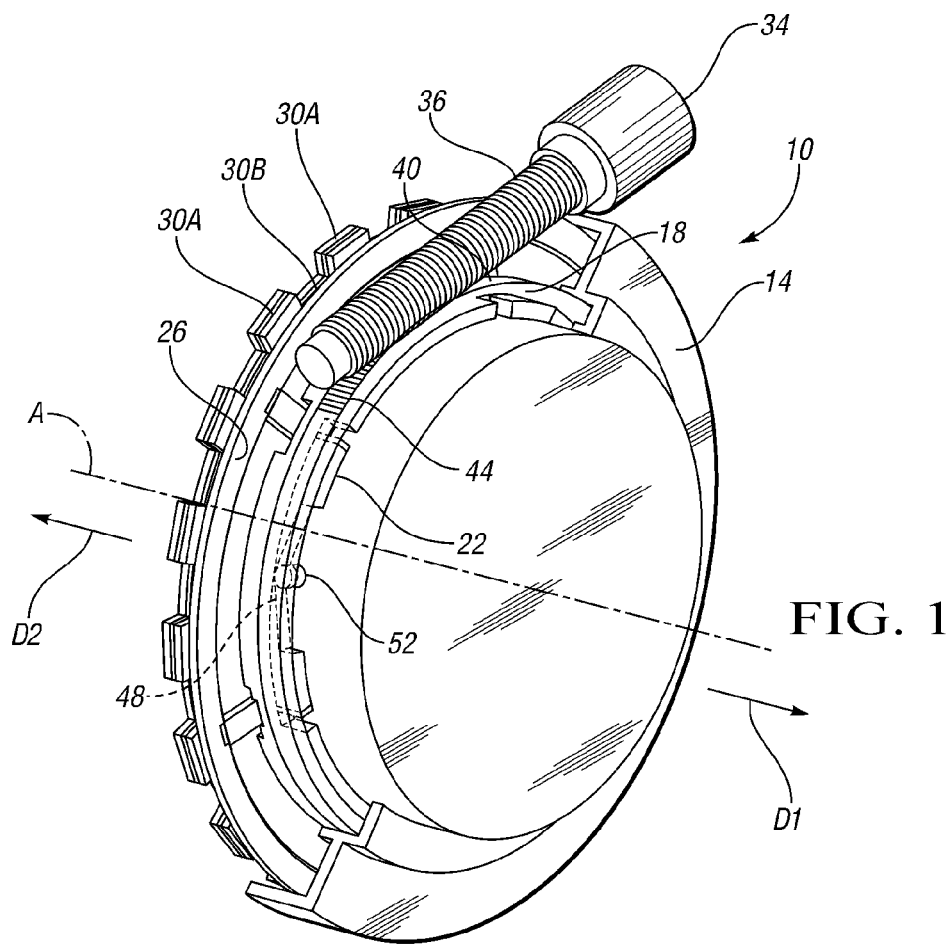
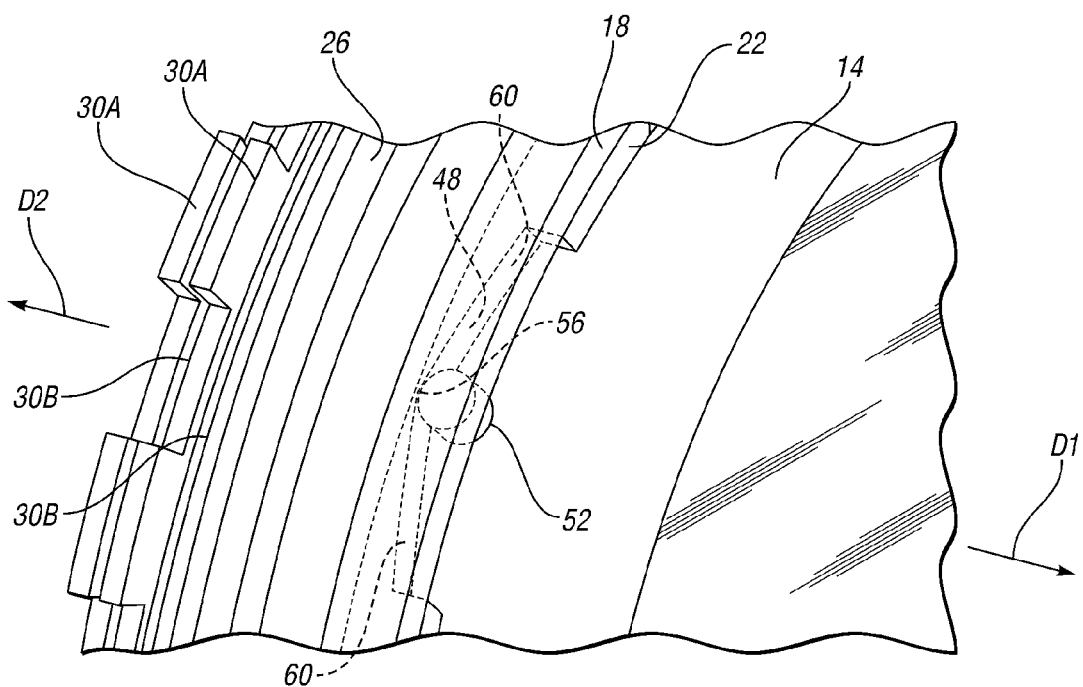
FIG. 1
FIG. 2

TORQUE TRANSMITTING DEVICE

TECHNICAL FIELD

This invention relates to torque transmitting devices that are engageable by electric actuation.

BACKGROUND OF THE INVENTION

Automatic transmissions typically include an input member, an output member, a stationary member, a plurality of planetary gearsets, and a plurality of selectively engageable torque transmitting devices. The torque transmitting devices, i.e., clutches and brakes, selectively couple various members of the planetary gearsets to other members of the planetary gearsets or to the stationary member to achieve a plurality of different speed ratios between the input member and the output member.

In a typical automatic transmission, the torque transmitting devices are hydraulically actuated. The transmission includes a hydraulic circuit that includes a pump and solenoid valves that control the application of fluid pressure to each of the torque transmitting devices.

SUMMARY OF THE INVENTION

According to a first aspect of the disclosure, a torque transmitting device includes a case, a plurality of clutch plates, a ramp member that is selectively rotatable about an axis and that defines a ramp surface, and a worm gear that is operatively connected to the ramp member for rotation therewith about the axis. A worm shaft is in meshing engagement with the worm gear such that rotation of the worm shaft causes rotation of the worm gear about the axis. A roller element is mounted with respect to the case and contacts the ramp surface.

The ramp surface is configured such that, when the ramp member is rotated about the axis, the roller element exerts a reaction force on the ramp surface that causes the ramp member to move axially and thereby transmit the reaction force to the clutch plates.

According to a second aspect of the disclosure, a torque transmitting device includes a case and a first plurality of clutch plates operatively connected to the case. A hub is selectively rotatable about an axis, and a second plurality of clutch plates are operatively connected to the hub for rotation therewith about the axis. A ramp member is selectively rotatable about the axis and defines a ramp surface. A roller element is mounted with respect to the case and contacts the ramp surface.

The ramp surface is configured such that, when the ramp member is rotated about the axis, the roller element exerts a reaction force on the ramp surface that causes the ramp member to move in a first axial direction and thereby transmit the reaction force to the clutch plates.

The torque transfer devices disclosed herein are engageable by an electric actuator, such as an electric motor, and thus do not require connection to a hydraulic circuit for actuation.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, partial perspective view of a torque transmitting device;

FIG. 2 is a schematic, perspective view of a portion of the torque transmitting device of FIG. 1;

DESCRIPTION OF THE PREFERRED EMBODIMENTS

Figure 3:
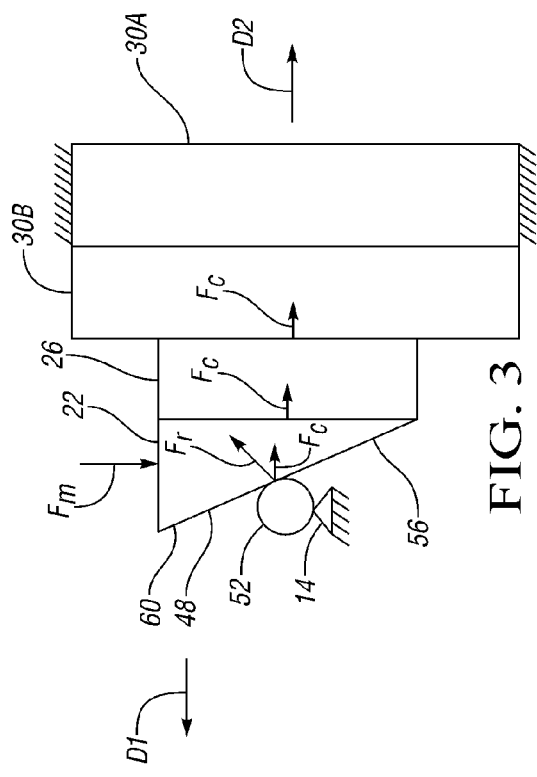
FIG. 3 is a schematic block diagram of a portion of the torque transmitting device of FIG. 1.

Referring to FIG. 1, a selectively engageable torque transmitting device 10 is schematically depicted. The torque transmitting device 10 includes a case 14, a worm gear 18, a ramp member 22, an apply member (e.g., apply ring 26), a first plurality of clutch plates 30A, and a second plurality of clutch plates 30B. An electric actuator, which, in the embodiment depicted, is an electric motor 34, is mounted with respect to the case 14 and is operative to urge the apply ring 26 against the clutch plates 30A, 30B to engage the torque transmitting device 10 via a torque-to-thrust mechanism.

More specifically, the electric motor 34 is operatively connected to a worm shaft 36 and is configured to selectively cause rotation of the worm shaft 36 by applying torque thereto. The worm gear 18 is characterized by a peripheral surface 40 having a plurality of teeth 44. The worm shaft 36 is meshingly engaged with the teeth 44 such that rotation of the worm shaft 36 causes rotation of the worm gear 18 about axis A.

The ramp member 22 is operatively connected to the worm gear 18, such as via splines, for rotation therewith about axis A. That is, the ramp member 22 is not rotatable with respect to the worm gear 18, but is selectively axially movable with respect to the worm gear 18 in a first axial direction D1 and a second, opposite axial direction D2. Referring to FIGS. 1 and 2, the ramp member 22 defines at least one ramp surface 48 that faces the first axial direction D1.

A roller element 52 is rotatably mounted with respect to the case 14, and is in contact with the ramp surface 48. The ramp surface 48 is characterized by portions 56, 60. Portion 56 of ramp surface 48 is axially disposed from portions 60 such that portion 56 is further in the second direction D2 than portions 60. In the embodiment depicted, two portions 60 extend on respective sides of portion 56.

When the torque transmitting device 10 is disengaged, the ramp member 22 is positioned so that the roller element 52 is in contact with portion 56 of the ramp surface, as shown in FIGS. 1 and 2. A spring (not shown) biases the ramp member 22 in the first axial direction D1, and, correspondingly, biases the ramp surface 48 in the first axial direction D1 to maintain contact between the roller element 52 and the ramp surface 48.

Referring to FIG. 3, the motor 34, acting via the worm shaft 36 and the worm gear 18, exerts force $F_m$ on the ramp member 22. As the ramp member 22 rotates, the ramp surface 48 moves relative to the roller element such that the roller element 52 traverses the ramp surface 48 from portion 56 toward portion 60. The incline of the ramp surface 48 causes the surface 48 to exert a force on the roller element 52, which in turn exerts a reaction force $F_R$ on the ramp surface 48. The reaction force $F_R$ includes a component $F_C$ in the second axial direction D2, which urges the ramp member 22 in the second axial direction D2. Accordingly the ramp 48 and the roller element 52 comprise a torque-to-thrust mechanism that converts the torque supplied by the electric motor to thrust, which is applied to the clutch plates 30A, 30B via the apply ring 26.

The ramp member 22 transfers the component $F_C$ of the reaction force $F_R$ to the apply ring 26, which in turn transfers the component $F_C$ to the clutch plates 30A, 30B, thereby engaging the torque transmitting device 10. With the self-enforcement principle of a wedge mechanism, a small force $F_m$ can be enlarged to a large axial force $F_C$. The torque transmitting device 10 can be engaged by rotating the ramp member 22 in either of two rotational directions, because the ramp surface 48 inclines in the first axial direction D1 on two opposing sides of portion 56, as shown in FIG. 2.

Referring again to FIG. 1, the worm shaft 36 and worm gear 18 are self-locking, and thus engagement of the torque transmitting device 10 can be maintained with minimal power applied by the motor 34. It should be noted that, although only one ramp surface 48 and one roller element 52 are shown in FIGS. 1-4, one or more ramp surfaces 48 and rollers 52 may be employed within the scope of the claimed invention. In the embodiment depicted, the ramp member 22 defines three ramp surfaces 48 spaced about the ramp member 22, each being in engagement with a corresponding roller element on the case 14.

Figure 4:
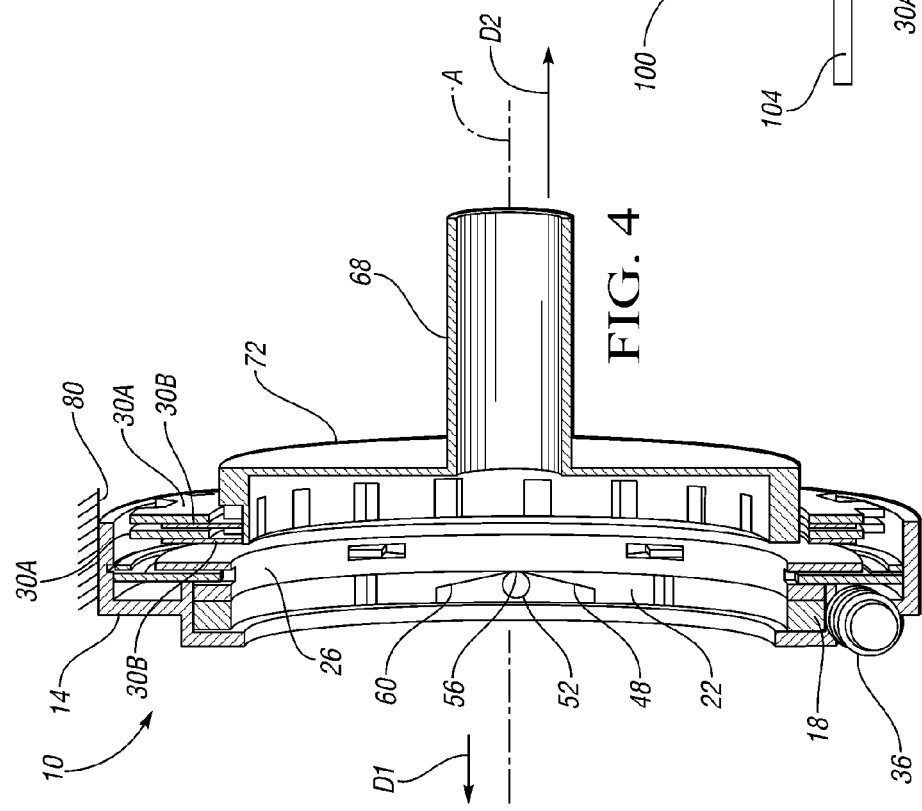
FIG. 4 is a schematic, sectional, side view of the torque transmitting device of FIG. 1.

Referring to FIG. 4, wherein like reference numbers refer to like components from FIGS. 1-3, the torque transmitting device 10 is shown operatively connected to a rotatable member 68. Member 68 is a shaft operatively connected to a member of a planetary gear set for rotation therewith about axis A. A hub 72 is mounted to the member 68 for rotation therewith. Friction plates 30B are splined to the hub 72 for rotation therewith, but are selectively axially movable with respect to the hub 72. Clutch plates 30B are splined to the case 14 such that the plates 30B are not rotatable with respect to the case 14, but are selectively axially movable with respect to the case 14.

When the torque transmitting device 10 is engaged, that is, when the apply ring 26 is urged in direction D2 to force plates 30A and 30B together, friction between the plates 30A, 30B locks member 68 to the case 14. In the embodiment depicted, case 14 is mounted to a stationary member, such as the transmission housing 80, and thus engagement of the torque transmitting device 10 prevents rotation of the member 68.

Figure 5:
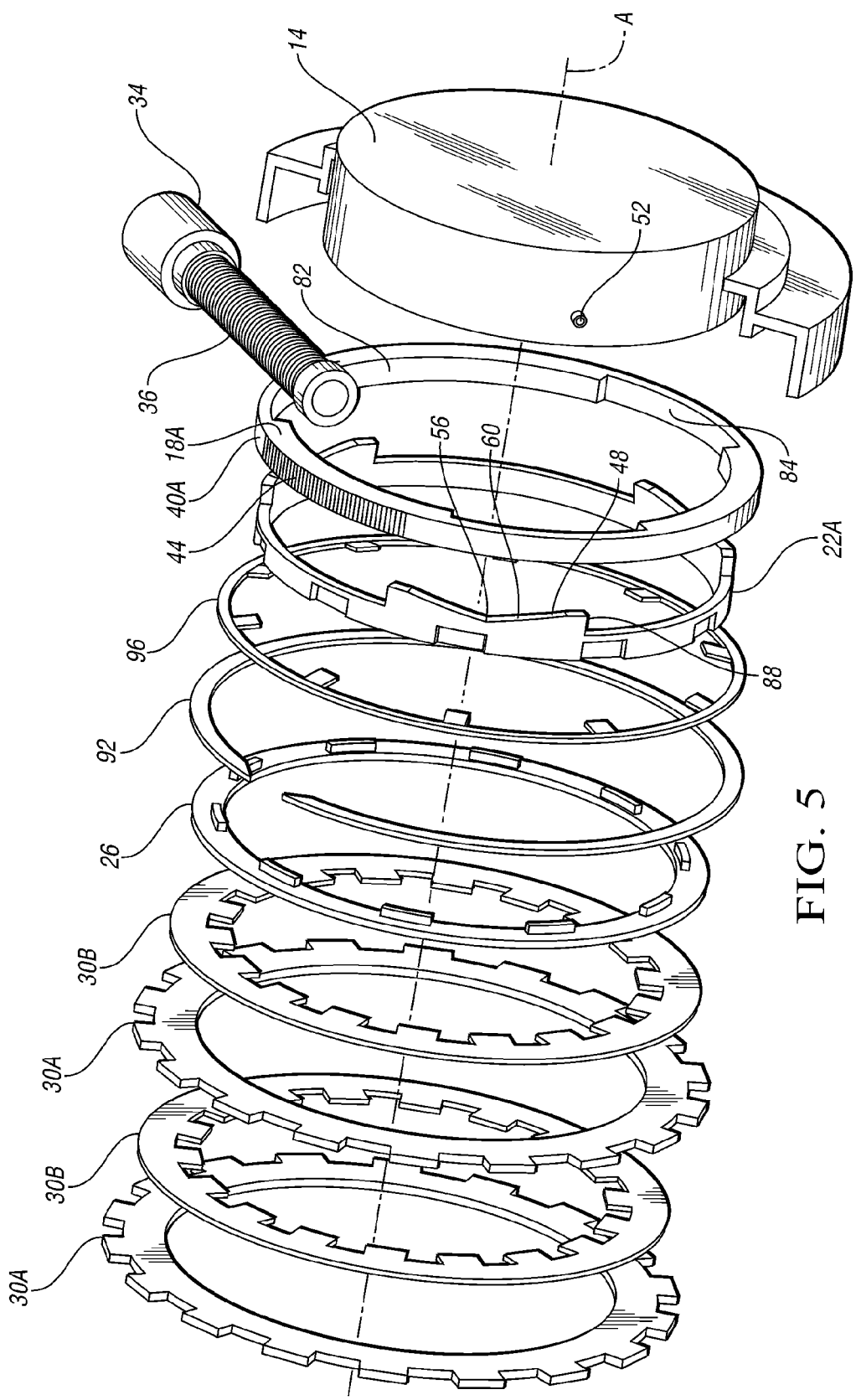
FIG. 5 is a schematic, exploded, perspective view of an alternative torque transmitting device in accordance with the claimed invention.

Referring to FIG. 5, wherein like reference numbers refer to like components from FIGS. 1-4, an alternative torque transmitting device 10A is schematically depicted. Torque transmitting device 10A includes case 14, worm gear 18A, ramp member 22A, apply ring 26, and clutch plates 30A, 30B. The peripheral surface 40A of worm gear 18A defines teeth 44 in engagement with worm shaft 36. The inner surface 82 of worm gear 18A defines notches 84.

The ramp member 22A includes axial projections 88 (only one of which is shown in FIG. 5). The axial projections 88 define ramps 48 and extend into a respective one of the notches 84. The interaction between the projections 88 and the walls defining the notches 84 prevents relative rotation between the worm gear 18A and the ramp member 22A about axis A, while permitting axial movement of the ramp member 22A relative to the worm gear 18A. The torque transmitting device 10A also includes a retention ring 92 and a belleville spring 96. The spring 96 biases the ramp member 22A in the first direction D1, i.e., toward the case 14 and away from the clutch plates 30A, 30B, so that surface 48 is urged into contact with roller element 52 on case 14.

Figure 6:
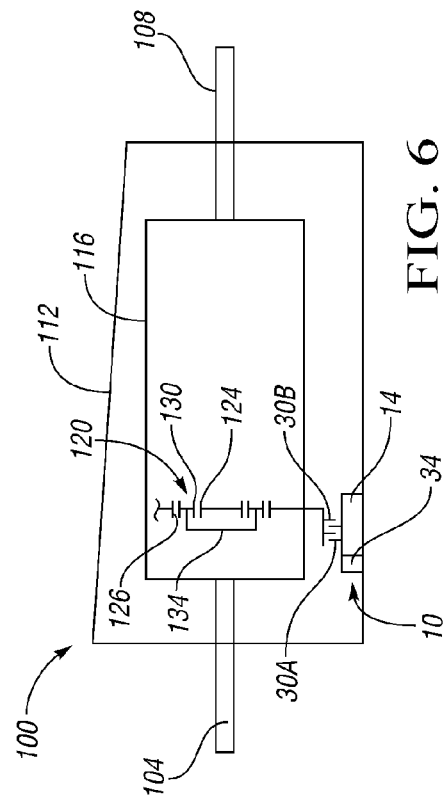
FIG. 6 is a schematic side view of an automotive transmission including the torque transmitting device of FIG. 1.

Referring to FIG. 6, wherein like reference numbers refer to like components from FIGS. 1-5, an automotive transmission 100 is schematically depicted. The transmission 100 includes an input member 104, an output member 108, and a stationary member, such as transmission housing 112. The input member 104 and the output member 108 are operatively connected to gearing 116. Gearing 116 includes a plurality of planetary gearsets, only one of which is shown at 120 in FIG. 6. The transmission 100 further includes a plurality of torque transmitted devices, i.e., clutches and brakes, that are configured to selectively couple various members of the planetary gearsets to other members of the planetary gearsets or to the housing 112 to achieve a plurality of different speed ratios between the input member 104 and the output member 108, as understood by those skilled in the art. The torque transmitting devices include torque transmitting device 10.

The exemplary planetary gearset 120 includes a sun gear 124, a ring gear 126, a plurality of planetary pinion gears 130, and a planet carrier 134. Each of the planetary pinion gears 130 is rotatably mounted to the planet carrier 134 and is meshingly engaged with the ring gear 126 and the sun gear 124. The case 14 of torque transmitting device 10 is mounted to the transmission housing 112. Clutch plates 30B are mounted with respect to ring gear 126 for rotation therewith via a hub. Thus, when motor 34 is activated, clutch plates 30A, which are mounted with respect to the transmission housing 112, engage clutch plates 30B, thereby coupling the ring gear 126 to the housing 112.

While the best modes for carrying out the invention have been described in detail, those familiar with the art to which this invention relates will recognize various alternative designs and embodiments for practicing the invention within the scope of the appended claims.

The invention claimed is:

1. A torque transmitting device comprising:
   a case;
   a plurality of clutch plates;
   a ramp member being selectively rotatable about an axis and defining a ramp surface;
   a worm gear that is operatively connected to the ramp member for rotation therewith about the axis;
   a worm shaft that is in meshing engagement with the worm gear such that rotation of the worm shaft causes rotation of the worm gear about the axis;
   a roller element mounted with respect to the case and contacting the ramp surface;
   wherein the ramp surface is configured such that, when the ramp member is rotated about the axis in either of two rotational directions, the roller element exerts a reaction force on the ramp surface that urges the ramp member to move in a first axial direction and thereby transmit the reaction force to the clutch plates; and
   an apply member operatively connected to the ramp member to receive the reaction force, and being selectively axially movable to contact at least one of said clutch plates.

2. The torque transmitting device of claim 1, further comprising an electric motor operatively connected to the worm shaft and configured to selectively apply torque thereto.

3. The torque transmitting device of claim 1, further comprising a spring biasing the ramp member in a second axial direction opposite the first axial direction.

4. A torque transmitting device comprising:
   a case;
   a first plurality of clutch plates operatively connected to the case;
   a hub that is selectively rotatable about an axis;
   a second plurality of clutch plates operatively connected to the hub;

a ramp member being selectively rotatable about the axis and defining a ramp surface;

a roller element mounted with respect to the case and contacting the ramp surface;

wherein the ramp surface is configured such that, when the ramp member is rotated about the axis in either of two rotational directions, the roller element exerts a reaction force on the ramp surface that urges the ramp member to move in a first axial direction and thereby transmit the reaction force to the clutch plates; and an apply member operatively connected to the ramp member to receive the reaction force, and being selectively axially movable to contact at least one of said clutch plates.

5. The torque transmitting device of claim 4, further comprising a worm gear that is rotatably mounted with respect to the case; and a worm shaft that is in meshing engagement with the worm gear such that rotation of the worm shaft causes rotation of the worm gear about the axis;

wherein the worm gear is operatively connected to the ramp member for rotation therewith.

6. The torque transmitting device of claim 5, further comprising an electric motor operatively connected to the worm shaft and configured to selectively apply torque thereto.

7. The torque transmitting device of claim 4, further comprising a spring biasing the ramp surface toward the roller element.

8. A transmission comprising:
an input member;
an output member;
a stationary member;
gearing operatively connected to the input member and the output member and configured to selectively provide a plurality of speed ratios between the input member and the output member;

said gearing including a planetary gearset having first, second, and third members; and a torque transmitting device including a case mounted with respect to the stationary member, a first plurality of clutch plates operatively connected to the case, a second plurality of plates operatively connected to said first member of the planetary gearset, a ramp member being selectively rotatable about an axis and defining a ramp surface, a worm gear that is operatively connected to the ramp member for rotation therewith about the axis, a worm shaft that is in meshing engagement with the worm gear such that rotation of the worm shaft causes rotation of the worm gear about the axis, and a roller element mounted with respect to the case and contacting the ramp surface;

wherein the ramp surface is configured such that, when the ramp member is rotated about the axis in either of two rotational directions, the roller element exerts a reaction force on the ramp surface that urges the ramp member to move in an axial direction and thereby transmit the reaction force to the first and second pluralities of clutch plates; and an apply member operatively connected to the ramp member to receive the reaction force, and being selectively axially movable to contact at least one of said clutch plates.

* * * * *